United States Patent
Iki

[11] 3,778,153
[45] Dec. 11, 1973

[54] OPTICAL IMAGING SYSTEM

[75] Inventor: Noboru Iki, Omiya City, Japan

[73] Assignee: Fuji Shashin Koki Kabushiki Kaisha, Omiya-shi, Saitama, Japan

[22] Filed: Mar. 29, 1972

[21] Appl. No.: 239,139

[30] Foreign Application Priority Data
Mar. 31, 1971   Japan.............................. 46/18706

[52] U.S. Cl. ................................................. 355/66
[51] Int. Cl. .......................................... G03b 27/70
[58] Field of Search............................ 355/8, 65, 66

[56] References Cited
UNITED STATES PATENTS
3,481,670   12/1969   Amemiya............................... 355/66

*Primary Examiner*—John M. Horan
*Attorney*—Addams and Ferguson

[57] ABSTRACT

An optical imaging system for image exposing a static image on a photosensitive plate comprising scanning means for progressively scanning the static object at a first speed with a light source; means for moving a first mirror in parallel in the same direction as the scanning means at a second speed, the plane containing the first mirror being inclined with respect to the plane containing the static image; means for moving a second mirror in parallel in the same direction as the first mirror at a third speed, the second mirror facing the first mirror, the plane containing the second mirror being inclined with respect to the plane containing the static image so that the optical length along the path defined by the scanning means, first mirror and second mirror is substantially constant at all points during the movement of the scanning means, first mirror and second mirror; means for optically focusing the image reflected from the second mirror onto the photosensitive plate; means for moving the photosensitive plate at a speed relative to the scanning means whereby the imaging system can be compactly arranged because the plane containing the second mirror is inclinded to the plane containing the static image.

1 Claim, 3 Drawing Figures

OPTICAL IMAGING SYSTEM

BACKGROUND OF THE INVENTION

1. Field of the Invention

This invention relates to an optical imaging system including a slit exposure device for scanning a static object. More precisely, this invention relates to an exposure device for use in a copying machine wherein a static object is scanned using mirrors to obtain magnified, reduced, or actual size copies which can be obtained from either a manuscript sheet or a bulky book, the photo-image being focused on a moving sensitive plate via a projection lens.

2. Description of the Prior Art

In conventional optical systems for scanning static objects, scanning is performed by fixed lens and mirrors. However, compact arrangement of the system is very difficult.

There have been attempts to avoid this problem, as disclosed in Japanese Patent Publication No. 6647/1964. The system disclosed in the Japanese publication comprises a fixed lens $a$, and parallel moving mirrors $b$ and $c$ which move in the direction of the arrow A, as shown in FIG. 1. Mirror $b$ (together with the light source above it) moves at a speed equal to that of the sensitive plate $e$, the latter moving in the direction of the arrow B. The mirror $b$ scans a static or non-moving object $d$. The speed of the mirror $c$ is one-half of that of mirror $b$, so that optical length in the system is kept constant. However, the mirror $c$ and the sensitive plate $e$ are perpendicularly disposed with respect to each other. Thus, since the incidence angle at mirror $c$ is equal to the reflection angle therefrom whereby the direction of the reflection tends downward rather sharply, the distance between the object $d$ and said plate $e$ is too long to permit a sufficiently compact arrangement of the optical system.

Summary of the Invention

Thus, an object of this invention is to provide a compact optical system wherein the position of the second mirror (corresponding to mirror $c$ of FIG. 1) is not perpendicular to the object but inclined to some extent thereto so that the slope of the reflection therefrom becomes comparatively gentle whereby the distance between the object and plate becomes relatively short when compared to that of the conventional system of FIG. 1. Further, the system is characterized in that the ratio of the parallel moving speeds of the light source and the first and second mirrors $b$ and $c$ is not limited to 1:1:½, as in the prior art, but rather is defined by a trigonometrical function ratio, whereby the optical length in the system is kept constant.

Other objects and advantages of this invention will become apparent upon reading the appended claims in conjunction with the following detailed description and the attached drawing.

DESCRIPTION OF PREFERRED EMBODIMENTS

Figure 2:
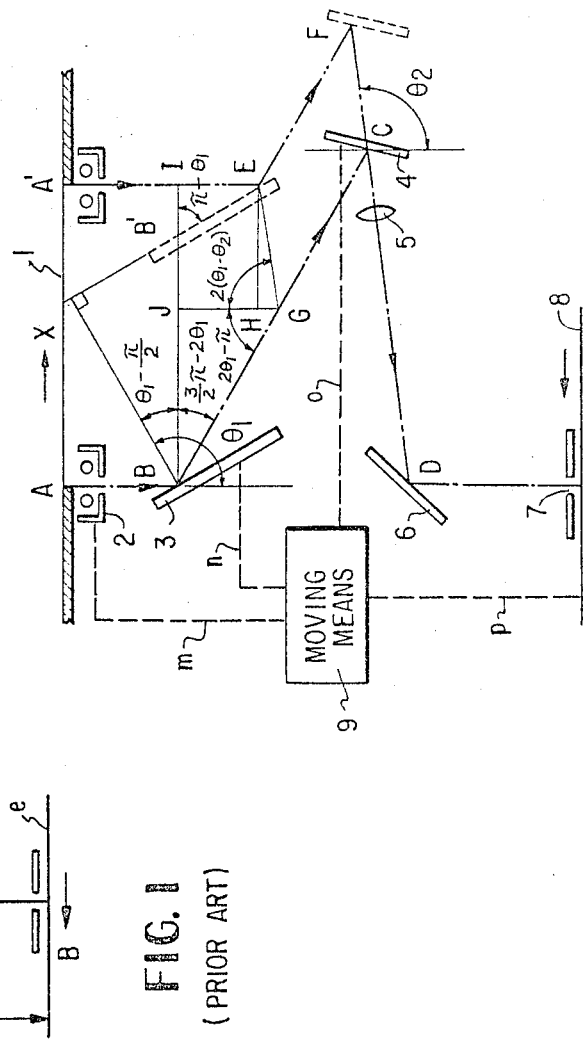
FIG. 2 is a diagram showing fundamentals of an embodiment of the scanning optical system according to this invention.

Referring to FIG. 2, the reflection image of an object 1 exposed by a light source or scanner 2 is focused on a moving sensitive plate 8 via a fixed lens 5, a fixed mirror 6, and slit 7 after successive reflections by a first mirror 3 moving in parallel to object 1 and a second mirror 4 moving in parallel at a speed related to that of mirror 3. The procedure for obtaining the relation between speeds of mirrors 3 and 4 will be now described.

Assume that the angles between the normal lines of mirrors 3 and 4 and the longitudinal axis are $\theta_1$ and $\theta_2$ respectively. Further, assume that the initial optical axis point of object 1 is A, that of mirror 3 is B, that of mirror 4 is C, that of fixed mirror 6 is D, and those of object 1, mirror 3, and said mirror 4 are A', E, and F respectively after scanning of the optical axis of object 1. The relation $$\overline{AB} + \overline{BC} = \overline{A'E} + \overline{EF} + \overline{FC} \tag{1}$$

must be established between the moved distance, $S_0$, of lighting source 2, $S_1$ of mirror 3, and $S_2$ of mirror 4 in order to keep the optical length constant before, after, and during scanning.

Assume that a line is drawn in parallel to $\overline{FC}$ from $E$ to form the line $\overline{EG}$ whereby GCFE forms a parallelogram, where $$\overline{EF} = \overline{GC}, \text{ and } \overline{FC} = \overline{EG}.$$

As $\overline{AB} = \overline{A'I}$, where $I$ is the intersection of the extension of $\overline{BB'}$ and $\overline{A'E}$, Eq. 1 can be written as $$\overline{BG} = \overline{IE} + \overline{EG} \tag{2}$$

realizing that $\overline{A'E} = \overline{AB} + \overline{IE}$ and $\overline{BC} = \overline{BG} + \overline{GC}$. Therefore, optical lengths before and after scanning can be kept constant if the relation, $$\overline{IE} + \overline{EG} = l \tag{2'}$$

Where $\overline{BG} = l$, is satisfied.

It can be shown that $$\overline{IE} = (S_0 - S_2) \tan(\pi - \theta_1)$$
$$\overline{EG} = S_2/\sin 2(\theta_1 \theta_2)$$

Hence, Eq. 2' can be converted to $$(S_0 - S_1)\tan(\pi - \theta_1) + S_2/\sin 2(\theta_1 - \theta_2) = l \tag{3}$$

Assuming that the intersection of the perpendicular line drawn through $G$ and $\overline{BI}$ is J, and the intersection of the line parallel to $\overline{BI}$ drawn through $E$ and $\overline{GJ}$ is H, $$S_0 - S_2 = \overline{BJ} = l \sin(2\theta_1 - \pi)$$

Hence, $$S_0 - S_2 = l \sin(2\theta_1 - \pi) \tag{4}$$

As $\overline{GJ} - \overline{GH} = \overline{EI}$, $$l \cos(2\theta_1 - \pi) - S_2 \cot 2(\theta_1 - \theta_2) = (S_0 - S_1)\tan(\pi - \theta_1) \tag{5}$$

So that, from Eqs. 3, 4, and 5

$S_2 = \sin 2(\theta_1 - \theta_2) [ 1 - \cos(2\theta - \pi)]l/1 - \cos 2(\theta_1 - \theta_2)$
$S_0 = l \sin(2\theta_1 - \pi) + S_2$
$S_1 = l \sin(2\theta_1 - \pi) + S_2 - [l \sin 2(\theta_1 - \theta_2) - S_2/\tan(\pi - \theta_1)\sin 2(\theta_1 - \theta_2)]$ By eliminating $S_2$ from above equations,
$S_2 = 2 \cot(\theta_1 - \theta_2) \cos^2 \theta_1$
$S_0 = 2 \cot(\theta_1 - \theta_2) \cos^2 \theta_1 [1 - \tan \theta_1 \tan(\theta_1 - \theta_2)]$
$S_1 = 2 \sin \theta_1 \cos \theta_1 + \sin(\theta_1 - \theta_2)\cos(\theta_1 - \theta_2) +$ $[\sin^2(\theta_1-\theta_2)\cos2\theta_1 - \cos^2\theta_1]/[\tan\theta_1\sin^2(\theta_1-\theta_2)]$ Therefore, $$S_0 : S_1 : S_2 = 1 - \tan\theta_1 \tan(\theta_1-\theta_2) :$$

$$\frac{2\{\frac{1}{2}\sin^2\theta_1\sin^2(\theta_1-\theta_2)+\sin^2(\theta_1-\theta_2)\cos^2\theta_1-\cos^2\theta_1\}}{\sin^2\theta_1\sin^2(\theta_1-\theta_2)} : 1$$

Accordingly, if the lighting device 2, the mirror 3, and the mirror 4 move in parallel at relative speeds which fulfill the above trigonometrical relation, the optical length can be kept constant and the copied image from the original will be focused on the sensitive plae 8 via lens 5 and fixed mirror 6.

For example,
$S_0 = 1.4619\,l$
$S_1 = 1.2339\,l$
$S_2 = 0.5959\,l$
when $\theta_1 = 120°$ and $\theta_2 = 80°$.

Thus,
$S_0 : S_1 : S_2 = 1 : 0.844 : 0.408$.

Therefore, when light source or scanner 2 moves at the same speed $v$ as that of the sensitive plate 8, and the first mirror 3 and the second mirror 4 move in parallel at the speeds $0.844v$ and $0.408v$ respectively, the optical length is kept constant and an actual size copy of the original is focused on plate 8. Means for moving the scanner 2, the mirrors 3 and 4, and plate 8 are diagrammatically indicated at 9, $m$, $n$, $o$ and $p$ and may be any means known to those of ordinary skill in the art.

Figure 3:
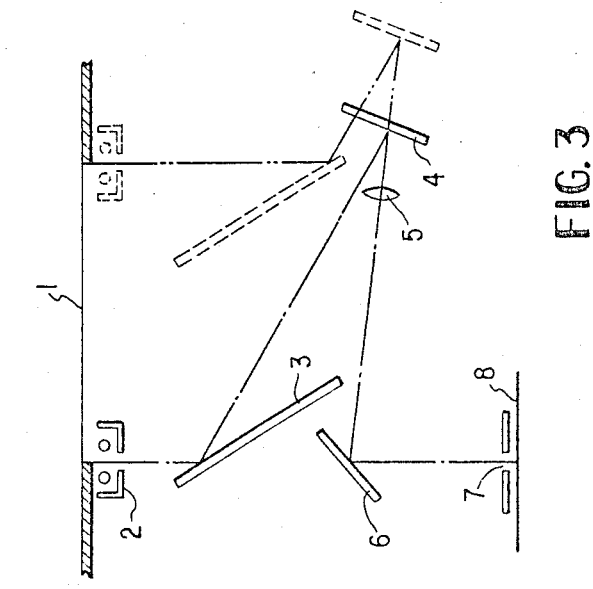
FIG. 3 is a diagram showing fundamentals of another embodiment of the same system according to this invention, where 1 is an object to be copied, 2 a lighting device, 3 a first mirror, 4 a second mirror, 5 a fixed lens, 6 a fixed mirror, and 8 a sensitive plate.

Similarly, as shown in FIG. 3.
$S_0 = 1.2856\,l$
$S_1 = 0.9542\,l$
$S_2 = 0.4196\,l$
when $\theta_1 = 120°$ and $\theta_2 = 70°$.

Thus,
$S_0 : S_1 : S_2 = 1 : 0.7422 : 0.3263$

Therefore, when said light source or scanner 2 moves at the same speed $v$ as that of plate 8, and mirrors 3 and 4 move in parallel at the speeds $0.7422v$ and $0.3263v$ respectively, the optical length is kept constant and an actual size copy of the original is focused on the plate 8. In this case, as the reflection from said mirror 4 is reflected upwards with respect to horizontal plane, whole optical system becomes much more compact.

Further, if $\theta_1 = 120°$ and $\theta_2 = 90°$, mirror 4 is perpendicular to the scanning plane, the following relationships hold:
$S_0 = \sqrt{3}\,l$
$S_1 = \sqrt{3}\,l$
$S_2 = \sqrt{3/2}\,l$ And,
$S_0 : S_1 : S_2 = 1 : 1 : \frac{1}{2}$ Accordingly, when the scanner moves at the same speed as that of the sensitive plate, and the first mirror and second mirror move in parallel at the speeds $v$ and $\frac{1}{2}v$ respectively, the optical length is kept constant. This relation is essentially equivalent to the relation in the previously mentioned Japanese Patent Publication shown in FIG. 1.

Figure 1:
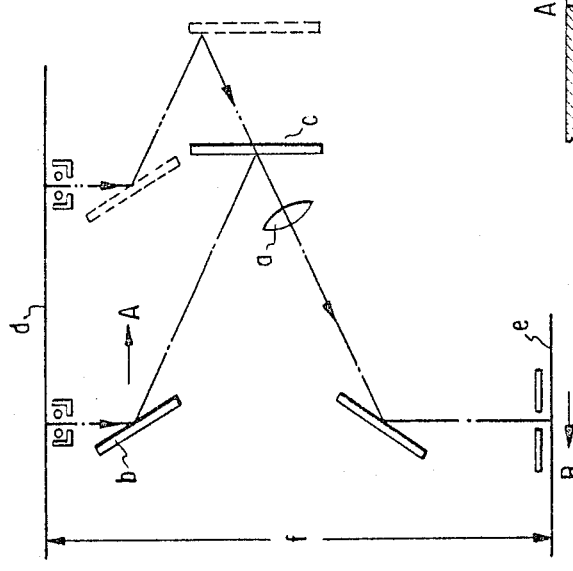
FIG. 1 is a diagram showing fundamentals of conventional scanning optical system.

According to this invention, as mentioned above, when the lighting device, the first mirror, and the second mirror move respectively at arbitrary speeds which are determined by the aforementioned trigonometrical speed ratio, the optical length can be kept constant and the copied image from the original can be focused on the sensitive plate. In other words, according to this invention, by suitably varying the angles $\theta_1$ and $\theta_2$ of the first and the second mirrors, wide selection of moving speed ratios of the lighting device and the mirrors is possible whereby the whole optical system can be much more compact than that of the prior art. Furthermore, in the optical system according to this invention, the first mirror 3 functions not only as a scanning mirror but also as a optical length correction mirror together with the second mirror 4, while the first mirror $b$ in the prior art as shown in FIG. 1 functions only as a scanning mirror, the correction of the optical length being exclusively performed by the second mirror $c$.

Thus, this invention makes it possible to produce a simple and compact copying machine in which copies of desired size, magnified, reduced, and actual size, can be focused on a moving plate from the original, which may be either a manuscript sheet or a bulky book, via mirrors and lens.

Numerous modifications of the invention will become apparent to one of ordinary skill in the art upon reading the foregoing disclosure. During such a reading it will be evident that this invention provides optical imaging system for accomplishing the objects and advantages herein stated.

What is claimed is:

1. An optical imaging system for image exposing a static image on a photosensitive plate comprising scanning means for progressively scanning a static object at a first speed with a light source;

means for moving a first mirror in parallel in the same direction as the scanning means at a second speed, the plane containing the first mirror being inclined with respect to the plane containing the static image;

means for moving a second mirror in parallel in the same direction as said first mirror at a third speed, said second mirror facing said first mirror, the plane containing said second mirror being upwardly directed with respect to the plane containing said static image so that the optical length along the path defined by the scanning means, first mirror and second mirror is substantially constant at all points during the movement of said scanning means, first mirror and second mirror;

means for optically focusing the image reflected from said second mirror onto said photosensitive plate;

means for moving said photosensitive plate at a speed relative to said scanning means;

whereby said imaging system can be compactly arranged because said plane containing said second mirror is upwardly directed with respect to said plane containing said static image, the ratios of the speeds of said scanning means and said first and second mirrors being $S_0 : S_1 : S_2 = 1 - \tan\theta_1 \tan(\theta_1 - \theta_2):$ $$\frac{2\{\frac{1}{2}\sin^2\theta_1\sin^2(\theta_1-\theta_2)+\sin^2(\theta_1-\theta_2)\cos^2\theta_1-\cos^2\theta_1\}}{\sin^2\theta_1\sin^2(\theta_1-\theta_2)} : 1$$

where
$S_0$ = said first speed
$S_1$ = said second speed
$S_2$ = said third speed
$\theta_1$ = the angle between the normal to said first mirror and the normal to said static image
$\theta_2$ = the angle between the normal to said second mirror and the normal to said static image.

* * * * *